United States Patent [19]

Malvy

[11] Patent Number: 5,216,908
[45] Date of Patent: Jun. 8, 1993

[54] SECURITY DEVICE, IN PARTICULAR AN ANTI-THEFT DEVICE FOR THE STEERING WHEEL OF A MOTOR VEHICLE

[76] Inventor: Michel Malvy, 24 rue Paul Valéry, 78460 Chevreuse, France

[21] Appl. No.: 910,747

[22] Filed: Jul. 8, 1992

[30] Foreign Application Priority Data

Apr. 27, 1992 [FR] France .................. 92 05156

[51] Int. Cl.⁵ ............................................. B60R 25/02
[52] U.S. Cl. ......................................... 70/218; 70/221; 70/386; 74/552
[58] Field of Search .................. 70/188, 189, 209, 218, 70/221-223, 252, 386; 74/552

[56] References Cited

U.S. PATENT DOCUMENTS

| | | | |
|---|---|---|---|
| Re. 15,587 | 5/1923 | Pagelsen | 70/221 X |
| 802,983 | 10/1905 | Gilbert | 292/137 |
| 1,476,145 | 12/1923 | Cantrall | 70/221 |
| 1,496,501 | 6/1924 | Vincent | 70/209 |
| 1,562,177 | 11/1925 | Lazear et al. | 70/221 |
| 1,580,881 | 4/1926 | Ganz | |
| 1,594,574 | 8/1926 | Stanley et al. | 70/209 |
| 1,714,914 | 5/1929 | Lazear | |
| 4,441,344 | 4/1984 | Kurpershoek | 70/221 X |

FOREIGN PATENT DOCUMENTS 2624921 12/1977 Fed. Rep. of Germany ........ 70/386

Primary Examiner—Lloyd A. Gall
Attorney, Agent, or Firm—Griffin Butler Whisenhunt & Kurtossy

[57] ABSTRACT

The invention relates to a security device, in particular an anti-theft device, of the type suitable for constraining the steering wheel to rotate with the steering column of a vehicle, or for allowing it to rotate relative thereto. According to the invention, the security device comprises a base secured to the steering column and surmounted by a central head; a box constrained to rotate with the steering wheel is mounted on the base and includes a guide passage in which a coupling slider is received free to move between a position in which it couples directly with the central head and uncoupled position, the slider being subjected to the action of springs tending to urge it towards its coupled position; a lock assembly is disposed in a secondary housing together with a cycle cylinder and a moving shaft, the shaft co-operates rates with an extension of the coupling slider to lock it in an uncoupled position or to release to take up the coupled position; and an external pusher arm makes it possible to return the slider into its uncoupled position.

22 Claims, 9 Drawing Sheets

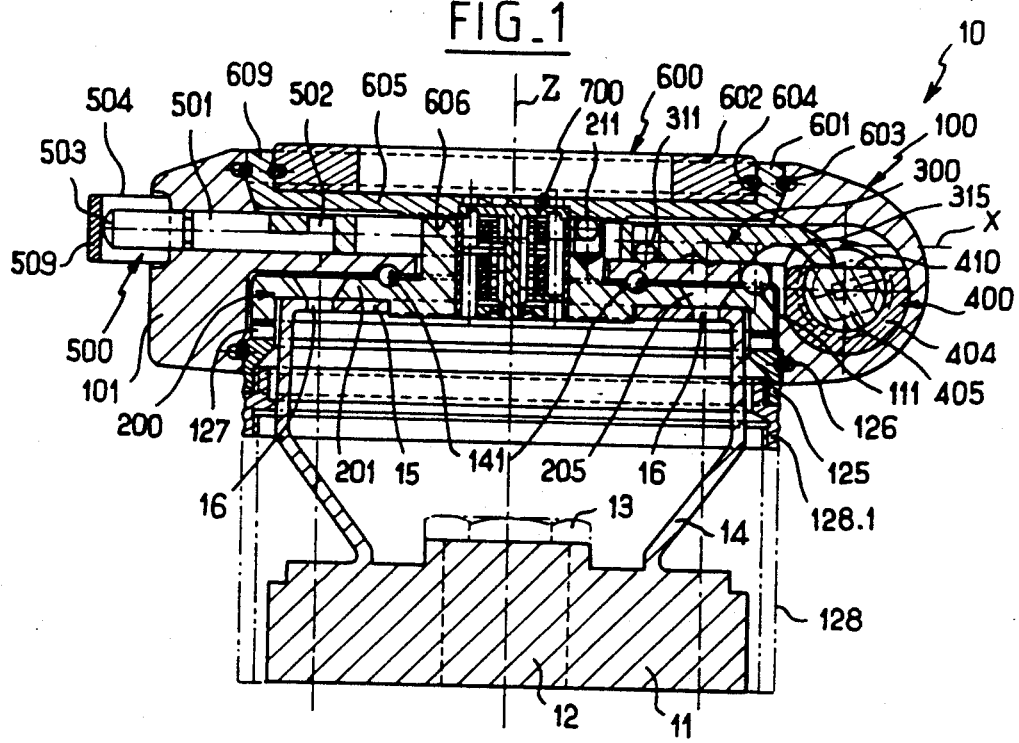
FIG_1
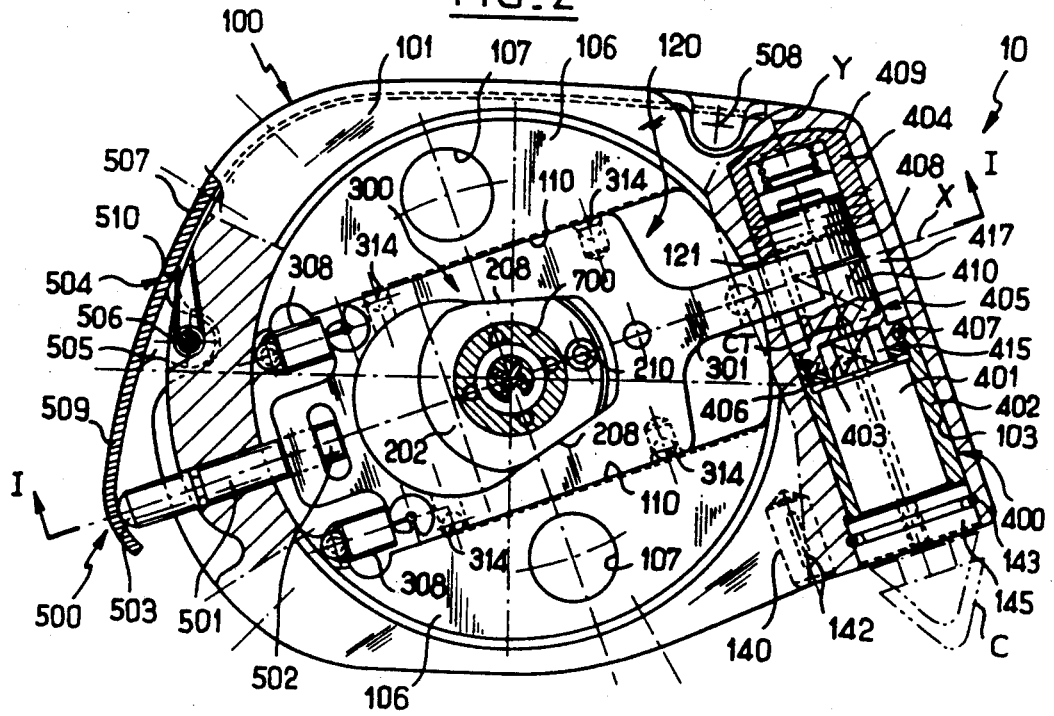
FIG_2

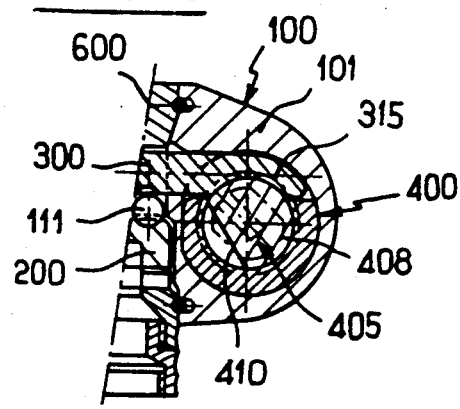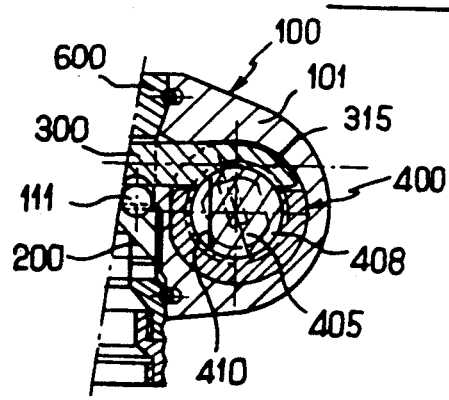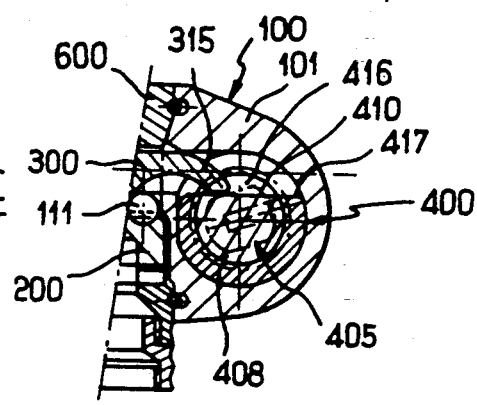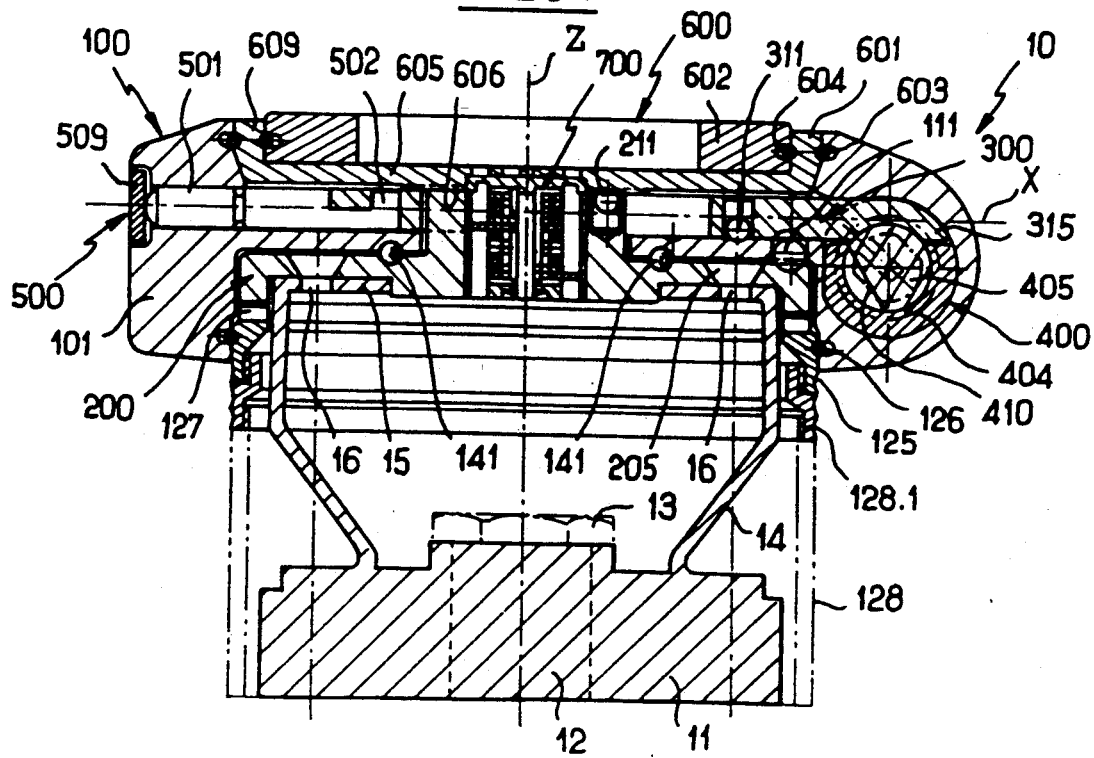

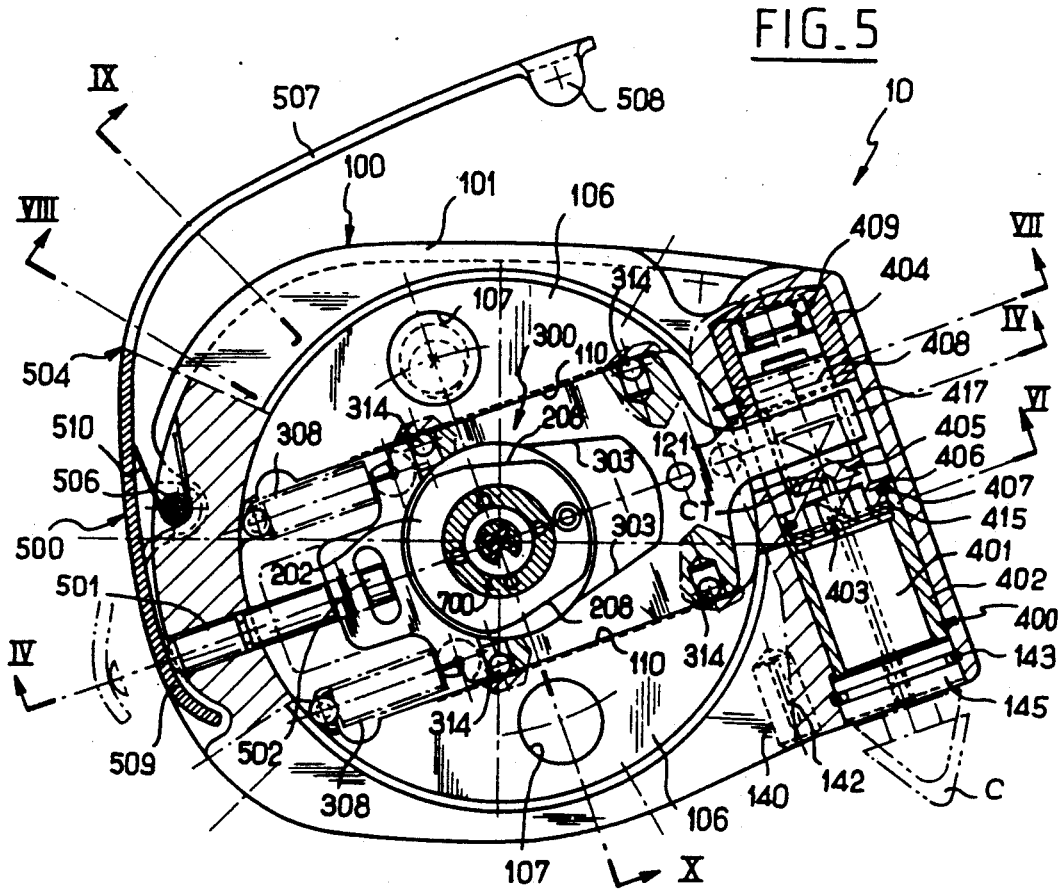
FIG_5
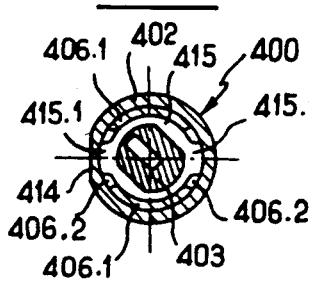
FIG_6
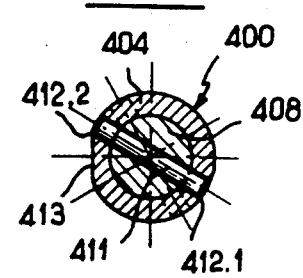
FIG_7
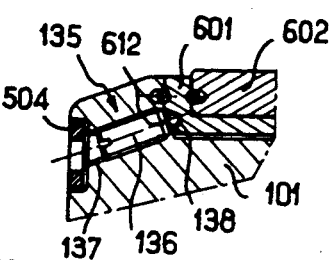
FIG_8
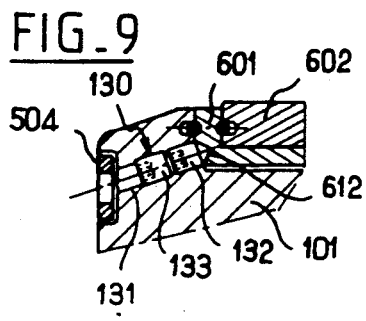
FIG_9
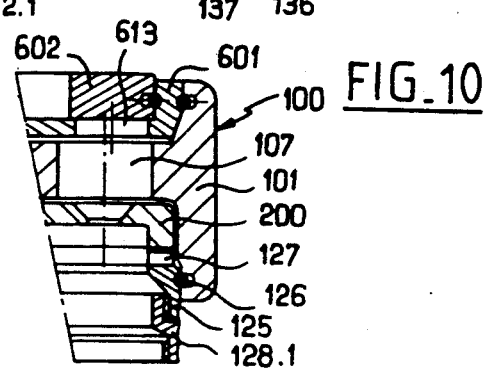
FIG_10

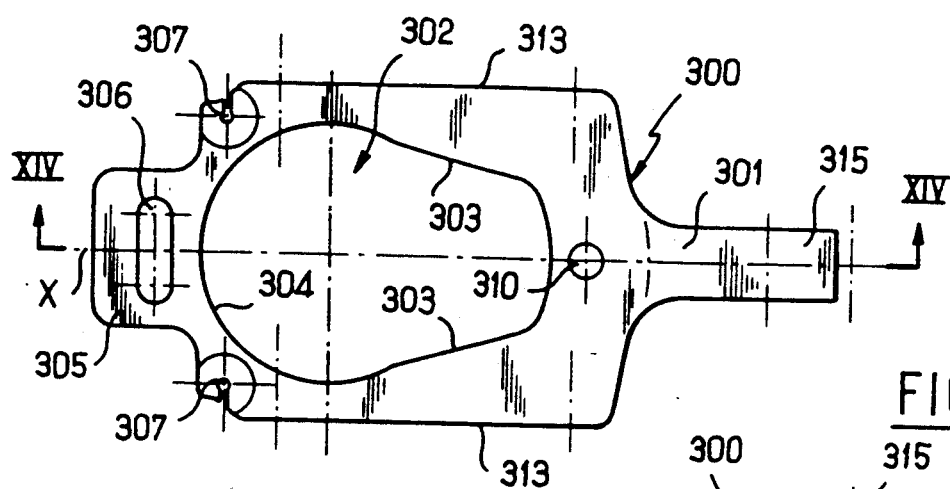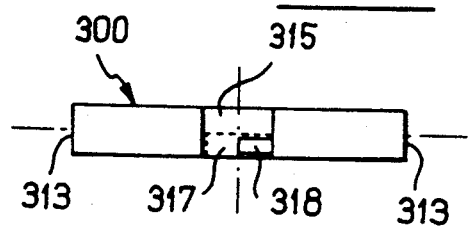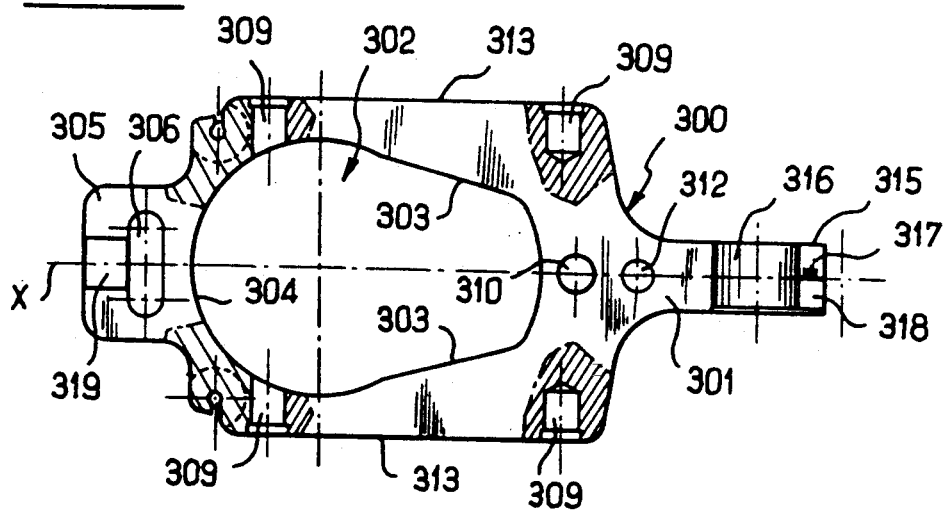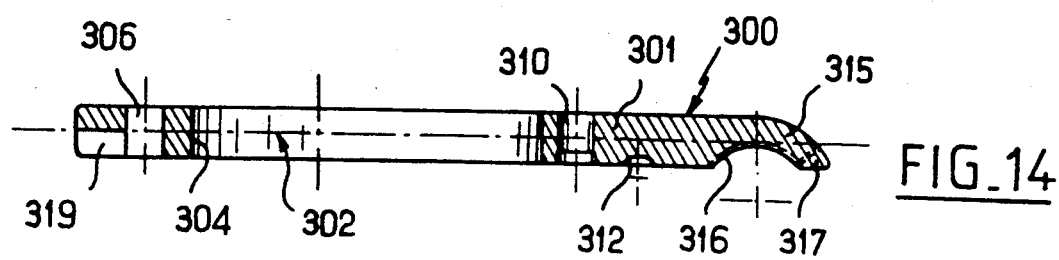

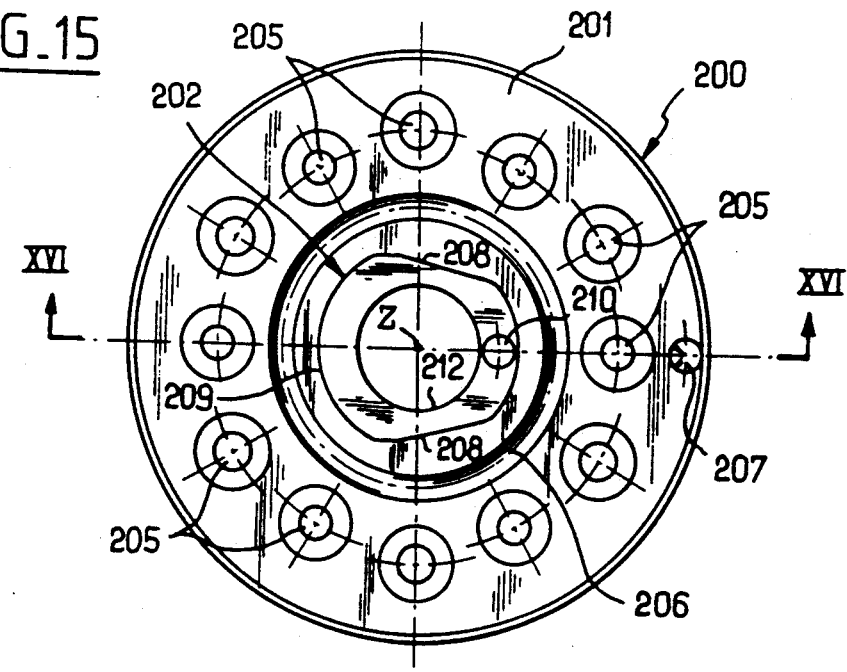
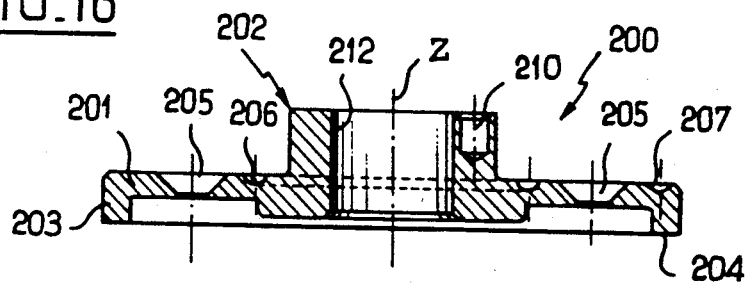
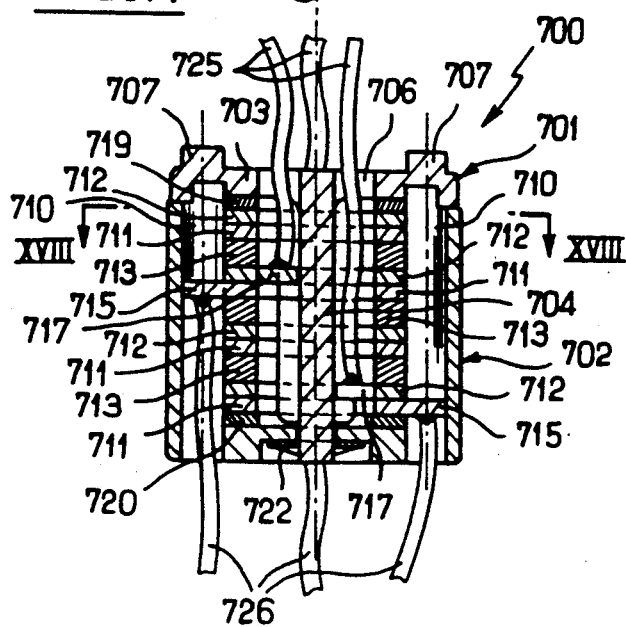
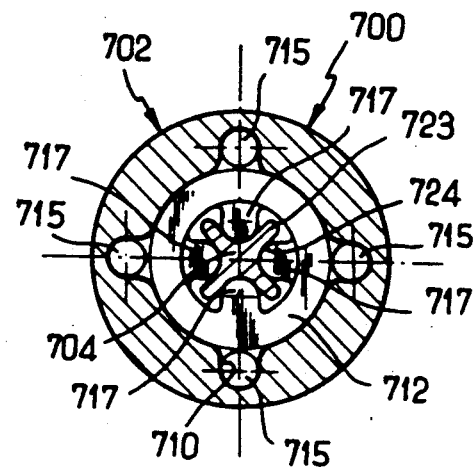

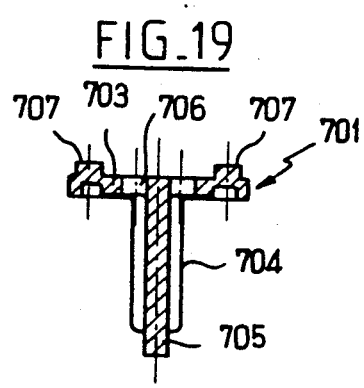
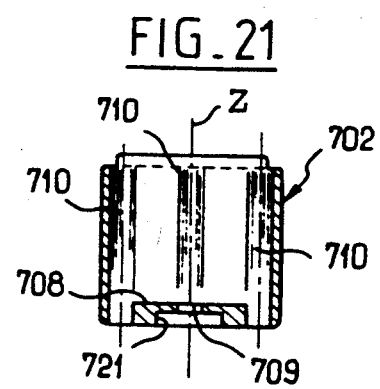
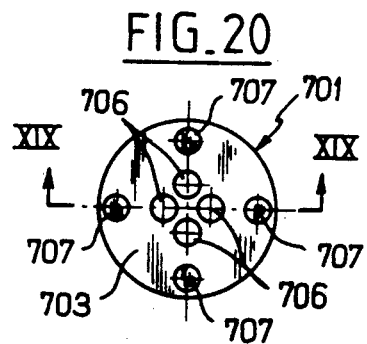
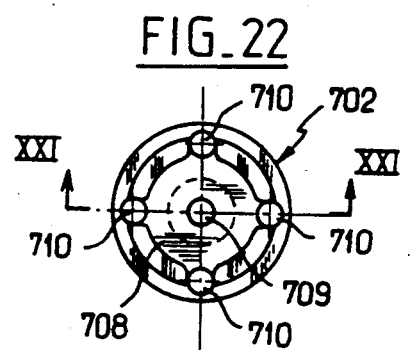
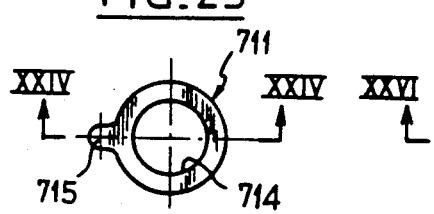
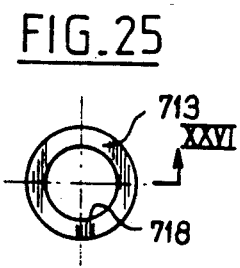
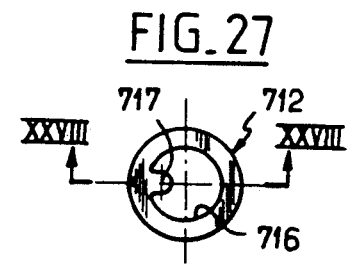
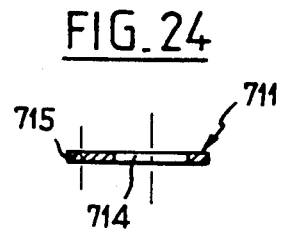
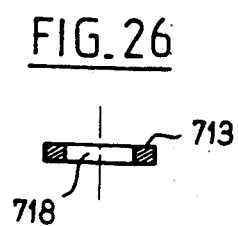
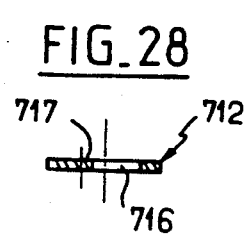

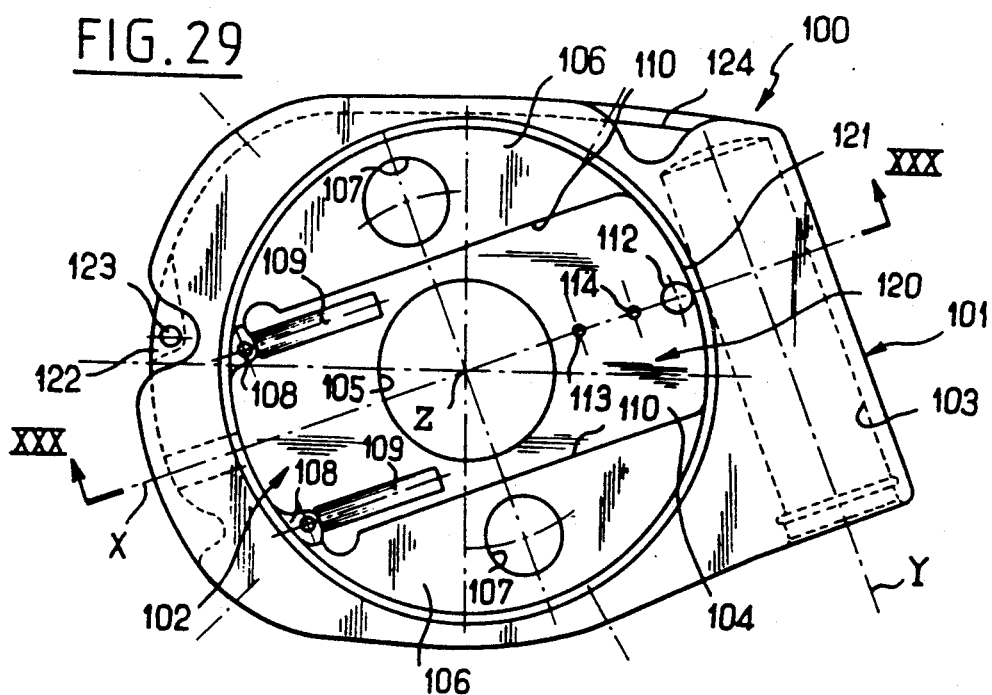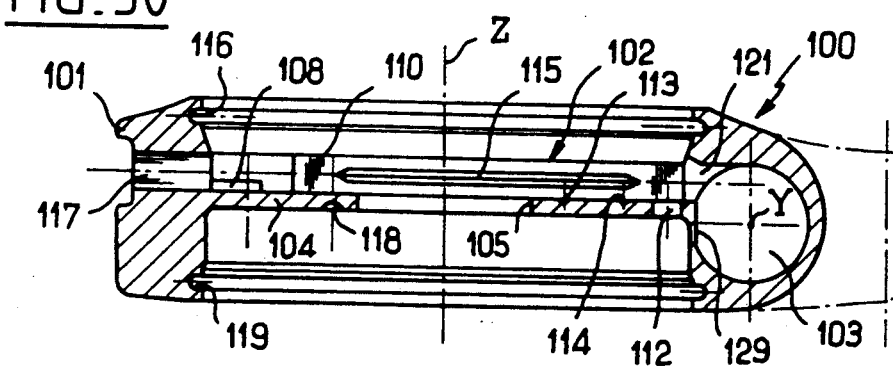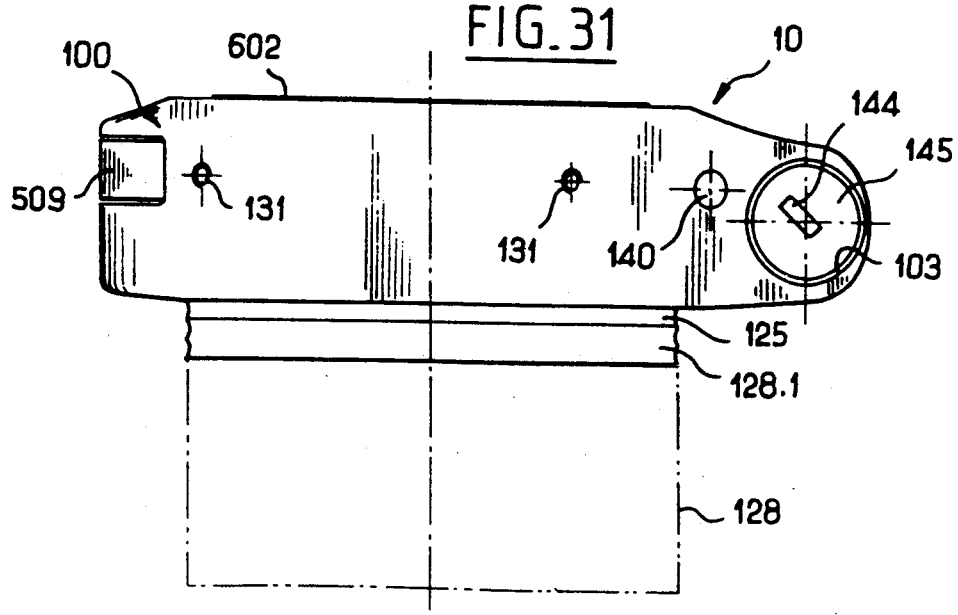

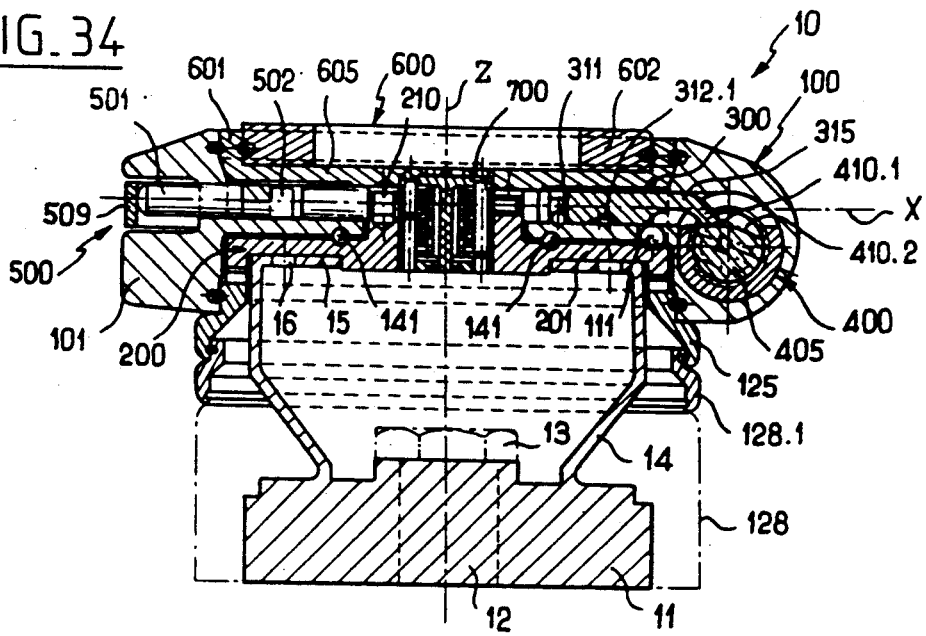
FIG. 34
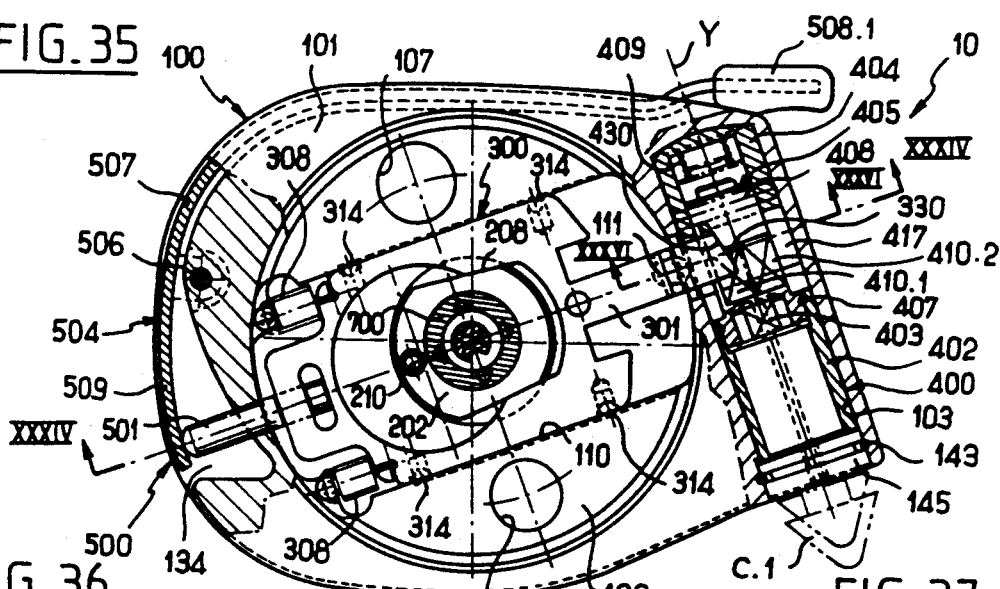
FIG. 35
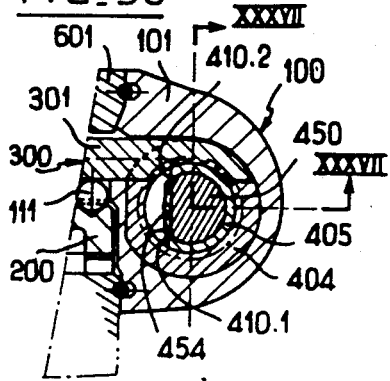
FIG. 36
FIG. 37

SECURITY DEVICE, IN PARTICULAR AN ANTI-THEFT DEVICE FOR THE STEERING WHEEL OF A MOTOR VEHICLE

The invention relates to a security device, in particular an anti-theft device for motor vehicles, the device being associated with the steering wheel of the vehicle, and more particularly being of the type suitable for either constraining the steering column of the vehicle to rotate with the steering wheel, or else releasing the steering wheel to rotate independently.

BACKGROUND OF THE INVENTION

Numerous anti-theft security devices already exist for motor vehicles, based on the general principle of a locking catch that is received in an associated recess in the steering column of the vehicle, level with a housing provided for the ignition key.

Nevertheless, such devices can be broken in the event of a break-in so that they no longer fulfill their security function. Even if they are not broken sufficiently to manage to unlock the steering column, damage is often caused to the steering column, to the steering wheel, and to the trim of the dashboard.

That is why designers have been led to consider systems that enable the steering wheel to be decoupled from the steering column.

Certain systems have thus been proposed in which the steering wheel can be decoupled from the steering column so as to release the steering wheel, as illustrated, for example, in the following documents: U.S. Pat. No. 1,809,765, FR-A-2 406 545, FR-A-2 545 431, and FR-A-2 584 353. Such systems nevertheless suffer from the drawback of requiring the steering wheel to be carried away, which is inconvenient.

Mention may also be made of systems that make use of erectile coupling studs which are moved under the control of an electric motor (e.g. as shown in Document FR-A-2 527 999). Such systems are nevertheless complicated and not very reliable; in addition, electrical control is not possible on all steering wheels, thereby limiting possible applications.

Document EP-A0 008 308 describes a device in which the steering column is made in two portions, one of which portions is designed to be removable or installable so that coupling between the steering column and the steering wheel can be interrupted or, on the contrary, re-established. Such a device nevertheless suffers from the drawback of requiring the steering column of the vehicle to be specially adapted, which is expensive. In addition, the device is not suitable for fitting rapidly and reliably.

Proposals have also been made to provide an anti-theft mechanism for a vehicle by removing a part of the anti-theft device, such removal automatically decoupling the steering wheel from the steering column. This state of the art is particularly well illustrated by the following documents: EP-A0 162 986, EP-A0 203 850, and EP-A-0 445 024.

The devices described in above-mentioned documents EP-A-0 162 986 and EP-A-0 203 850 rely on the general principle of an axial stack of parts coaxial with the steering column, and the user must extract from the stack a part that provides rotary coupling between its upstream and downstream ends in the stack. Such devices have the advantages of being relatively simple to design, but they require disassembly in order to enable the parts to be extracted (as in document EP-A-0 162 986) or else they require coupling means of more sophisticated design to be provided so that only one removable item needs to be disengaged such as a pin having retractable balls (as in document EP-A-0 203 850).

In a variant of the above-mentioned devices, proposals have recently been made for an off-axis mount enabling the steering wheel to pivot about an axis parallel to the steering column but offset therefrom: a laterally disposed removable part provides coupling with the steering column when in place and enables decoupling to be achieved when it is removed to be taken away (leaving the steering wheel rotating on its off-axis mount). Such a system is nevertheless relatively vulnerable insofar as the removable part is directly accessible, thereby enabling it to be tampered with: in addition, the mount runs the risk of being jammed if it is too tight.

The state of the art is also illustrated by Documents U.S. Pat. No. 4,924,685 and EP-A-0 402 938, which describe mechanisms in which a portion associated with the steering wheel is displaceable along the axis of the steering column by direct coupling (using a cam or a rack) with the cylinder of a lock.

An object of the invention is to provide a security device which is more effective than the above-mentioned system with respect to security, and reliability, and also ease of use.

Another object of the invention is to provide an anti-theft security device equally capable of being installed on initial assembly (during manufacture) or as a retrofit (by altering items that already exist, thereby equipping a vehicle with the security device).

SUMMARY OF THE INVENTION

More particularly, the present invention provides a security device, in particular an anti-theft device for the steering wheel of a motor vehicle, the device being of the type suitable for constraining the steering column to rotate with the steering wheel, or for allowing the steering wheel to rotate relative to said column, wherein the device comprises:

a base secured to the steering column, said base comprising a base plate extending perpendicularly to the axis of said steering column, and a central locking head;

a box secured to rotate with the steering wheel and mounted on the base so as to be capable of rotating about the axis of the steering column, said box including a guide passage in which a coupling slider is received to slide along a direction substantially perpendicular to the axis of the steering column between a position where it is directly coupled with the central head of said base and a position where it is uncoupled from said central head, said coupling slider having an extension which penetrates transversely into a secondary housing of the box and also being subjected to the action of resilient means urging it towards its coupled position;

a lock assembly disposed in the secondary housing with a cycle cylinder mounted stationary in the box together with a moving shaft associated with said cycle cylinder and axially linked to a lock plug, said moving shaft co-operating with the extension of the coupling slider to lock said coupling slider in its uncoupled position or to release said slider to take up its coupled position, said co-operation being possible only with insertion of a key and in compliance with the cycle determined by said cylinder; and a pushbutton activatable from outside the box enabling the coupling slider to be returned to its uncoupled position against the associated resilient means.

Preferably, the rotary coupling between the slider and the central head of the base is obtained by co-operation between associated facets which are symmetrically inclined towards the extension of said slider.

It is then advantageous for the coupling slider to be made in the form of a plate having a central opening through which the central head of the base passes, said opening including two symmetrically inclined facets which run into each other via an essentially circular enlarged outline, said central head having firstly two inclined facets which co-operate with the corresponding facets of the slider when in the coupled position, and secondly a cylindrical surface in the direct vicinity of which the enlarged outline of said slider comes when in the uncoupled position.

Also preferably, the moving shaft of the lock assembly is essentially cylindrical apart from an intermediate flat, and the extension of the coupling slider terminates in a hollowed-out nose in such a manner that said moving shaft locks the slider in the uncoupled position by means of its cylindrical portion and releases said slider when its intermediate flat is substantially parallel with the sliding direction of said slider.

In particular, the hollowed-out nose of the extension of the coupling slider may then have a lateral notch on its side furthest from the end of the lock into which the key is inserted, and in which a rim of the moving shaft adjacent to the intermediate flat of said shaft is received, so that in said position, untimely operation of said slider and untimely operation of said shaft are simultaneously prevented.

In a variant, the intermediate flat is constituted by two half-flats at a small mutual angular offset, and the bottom of the coupling slider has an indentation associated with a locking and positioning ball, which indentation is elongate in the sliding direction of said slider. Advantageously, the extension of the coupling slider then has an end face which is inclined relative to the axis of the moving shaft of the lock assembly, and the moving shaft has a corresponding sloping facet, said sloping face and said sloping facet being in contact with each other in the coupled position of said slider, such that when in said position, untimely operation of said slider and untimely operation of said shaft are simultaneously prevented.

It is also advantageous for the cycle cylinder to be designed in such a manner that the moving shaft has axial clearance in two special angular positions, said shaft also being subjected to the action of a thrust spring tending to maintain the angular locking achieved in this way, such that in order to move the coupling slider from its coupled position to its uncoupled position, it is necessary to act simultaneously both on the pushbutton by manual action and on the moving shaft by applying thrust on an inserted key.

In particular, the spacer of the lock plug then carries a security locking washer which is constrained to rotate together therewith, said washer having at least one lug passing through an associated slot of the moving shaft.

In a variant, the lock assembly includes an intermediate security locking piece received in the moving shaft, said piece being movable along the axis of said assembly and providing coupling between the spacer of the lock plug and said shaft only when it is pushed back against an associated return spring by the end of an elongate key.

Also advantageously, the externally actuatable pushbutton comprises firstly a push rod having one end latched to the coupling slider, and having its other end projecting from the box, and secondly an operating arm hinged on said box, with a portion thereof bearing against said push rod.

It is also advantageous for the box to have a central guide passage in which the coupling slider slides, said passage being defined by two lateral projections, with at least one positioning ball also being provided to mark the two extreme positions of the coupling slider.

Advantageously, guide balls are then also provided to obtain accurate positioning of the coupling slider relative to the lateral projections during displacement of said slider between said two positions, and the bottom of the box also has a hole for a locking and positioning ball, the bottom of which is received in an indentation in the base plate of the base when the steering wheel is properly positioned, the coupling slider also having an indentation in which the top of the locking and positioning ball is received in the uncoupled position in the event of the steering wheel being rotated, thereby locking said slider in said position, said ball continuing to lock it in said position so long as the steering wheel is not correctly positioned.

Also preferably, the bottom of the box rests on the base plate of the base via balls which run on a circular path provided in the top face of said base plate, the box being secured to the base by a securing ring bearing against the bottom edge of said base via a spring washer. In particular, the top portion of the steering column is protected by a coaxial skirt carried by the box, said skirt preferably being built up from rings or shells connected to one another and to the securing ring in such a manner as to enable the height of said skirt to be adapted to the type of steering column in question.

It is also advantageous for the box to be constrained to rotate with the steering wheel by means of a central cover which is snap-fastened by a spring clip on said box, said central cover being locked in rotation by associated means which are accessible from outside the box.

It is then advantageous for the central cover to be made in two parts which interfit and which are secured to each other in undismountable manner, with a bottom part being locked to the box and a top part in the form of a ring engaging in said bottom part, said top part having tapped holes associated with means for fastening to the steering wheel. In particular, the bottom part of the central cover has indentations on its periphery, e.g. every 10°, for the purpose of adjusting the angular position of the steering wheel relative to the box, a ball positioning means co-operating with said indentations and being provided to facilitate such angular positioning.

It is also advantageous for the central head of the base to carry an audible warning ball co-operating with a serrated surface formed at the outside of the bottom part forming the central cover, thereby providing a warning when the steering wheel is not coupled to the steering column.

Finally, it is preferable for a central region of the bottom part of the central cover to include both first holes for passing any connection wires leading to the steering wheel, and second holes for rotary coupling to an assembly received in a central bore of the base and forming a rotary contact.

It is then advantageous for the rotary contact forming assembly to comprise a tubular body having axial grooves secured to the base and a top cap having a star-shaped central core coupled to rotate with the bottom part of the central cover, together with a succession of stacks each constituted by a first contact washer coupled to the body via an axial groove thereof, a second contact washer coupled to the top cap via a central core thereof, and an insulating washer. In particular, the rotary contact assembly includes a body having four axial grooves disposed in a square configuration and a top cap having a cruciform central core.

BRIEF DESCRIPTION OF THE DRAWINGS

Embodiments of the invention are described by way of example with reference to the accompanying drawings, in which:

FIG. 1 is a section view showing an anti-theft security device of the invention in which the coupling slider is in its coupled position, said device being mounted on a hub of a column that is rigidly secured to the steering column;

FIG. 2 is a plan view of the above device from which its central snap-fastened cover has been removed so as to show the coupling slider more clearly, here also in the coupled position (FIG. 1 thus being a section on I—I of FIG. 2);

FIGS. 3a to 3c are fragmentary sections on the midplane of the coupling slider, showing various positions of the moving shaft of the lock assembly in the associated cycle cylinder, FIG. 3a corresponding to a decoupled position and FIG. 3c to a coupled position.

FIGS. 4 and 5 are views analogous to FIGS. 1 and 2, showing the same device with its coupling slider in the decoupled position (with FIG. 4 thus being a section on IV—IV of FIG. 5);

FIGS. 6 to 10 are fragmentary sections on lines VI, VII, VIII, IX, and X of FIG. 5, showing respectively a security locking washer, the axis of the moving shaft associated with the cycle cylinder, and various means associated with the central cover;

FIGS. 11 to 13 are elevation views respectively from above, from the side, and from below of the coupling slider, and FIG. 14 is an associated section on XIV—XIV of FIG. 11;

FIG. 15 is a plan view of the base on which the box of the device is mounted, and FIG. 16 is an associated section on XVI—XVI of FIG. 15;

FIG. 17 is a section view through the rotary contact assembly which is integrated in the above-mentioned base, and FIG. 18 is an associated section on XVIII—XVIII of FIG. 17;

FIG. 20 and the associated section on XIX—XIX (FIG. 19) show the top cap having a cruciform central core of the above-mentioned assembly;

FIG. 22 and the associated section on XXI—XXI (FIG. 21) show the cylindrically-shaped body having axial grooves of said assembly;

FIGS. 23, 25, and 27 and the associated sections on XXIV—XXIV, XXVI—XXVI, and XXVIII—XXVIII (FIGS. 24, 26, and 28) respectively show a first contact washer, an insulating washer, and a second contact washer fitted to the above-mentioned assembly;

FIGS. 29 and 31 are a plan view of the box on its own and a side view of the box fitted with the device, and FIG. 30 is an associated section on XXX—XXX of FIG. 29;

FIGS. 34 and 35 are sections analogous to FIGS. 1 and 2 (FIG. 34 then being a section on XXXIV—XXXIV of FIG. 35), illustrating a variant of the device of the invention (in the coupled position), with a moving lock shaft having two half-flats with locking between the slider and the moving shaft being by way of inclined facets; and FIG. 36 is a section on XXXVI-XXXVI of FIG. 35, on a larger scale, but in the uncoupled position, while FIG. 37 is a section on XXXVII—XXXVII of FIG. 36, these figures showing more clearly the intermediate security locking part associated with the lock assembly.

DETAILED DESCRIPTION

Figure 32:
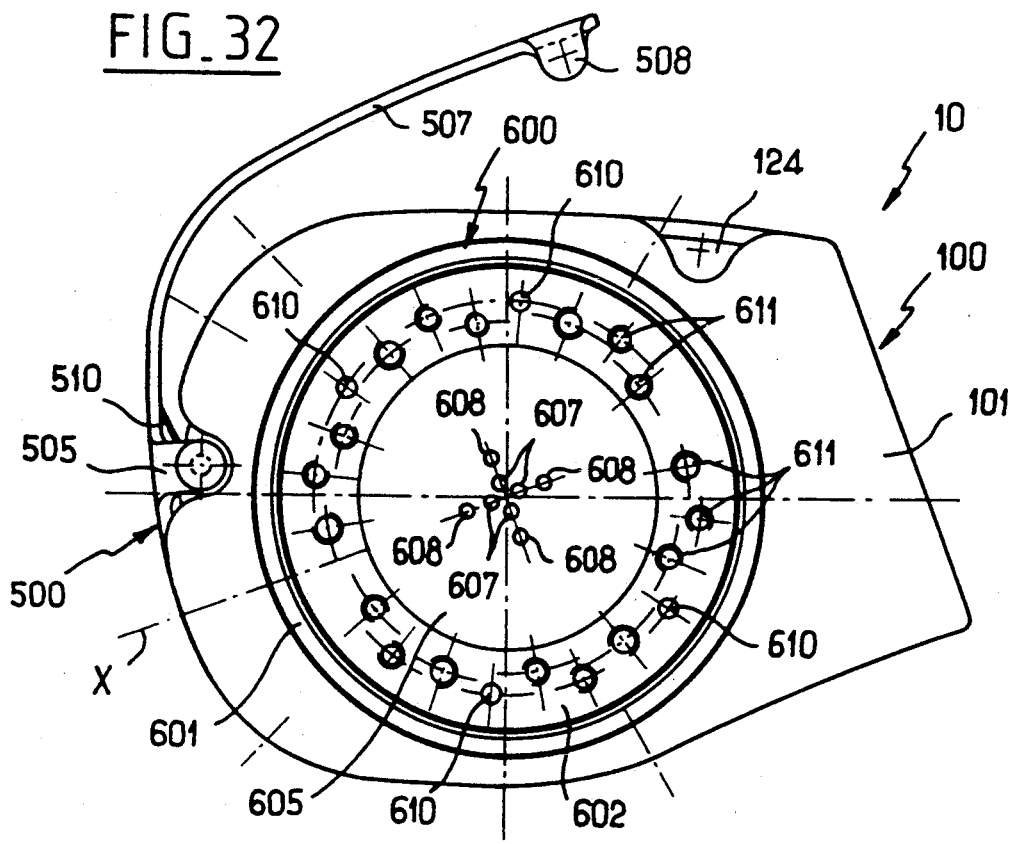
FIGS. 32 and 33 are plan views of the above device showing the central cover more clearly, respectively in the uncoupled position and in the coupled position.

FIGS. 1, 2, and 4, 5 show an anti-theft security device 10 of the invention, which device is shown mounted on a hub 11 secured to a steering column 12 of a vehicle to constitute an anti-theft system, said hub being secured by a bolt 13. The top portion of the hub is in the form of an extension 14 which may be continuous or in the form of branches, which extension is terminated by an inwardly directed rim 15 on which the fixed portion of the security device is mounted, i.e. in this case the base 200 of the device, by means of bolts (not shown) passing through associated holes 16 and 205. Naturally the base 200 of the device could be fitted to any type of terminal extension on the steering column so as to enable the device to be mounted on a steering column that was not specially designed for this purpose.

The device 10 thus includes a base 200 secured to the steering column 12, which base is constituted by a base plate 201 extending perpendicularly to the axis Z of the steering column, which base plate is surmounted by a central locking head 202. The specific structure of the base 200 is described in detail below with reference to FIGS. 15 and 16.

The security device 10 also includes a box 100 which is constrained to rotate with the steering wheel, and which is mounted on the base 200 in such a manner as to be able to rotate coaxially with the steering column 12, i.e. about the axis Z of said column. The steering wheel is not shown here, but tapped holes 611 for fastening the steering wheel can be seen in FIGS. 32 and 33, which tapped holes are provided in a portion of a central cover 600 whose exact structure is described in detail below with reference to FIGS. 32 and 33.

As can be seen more clearly in FIGS. 2 and 5, the box 100 includes a guide passage 120 which receives a coupling slider 300 which is movable in a direction X that is substantially perpendicular in this case to the axis Z of the steering column. It would naturally be possible to have a direction X that is not perpendicular to the axis Z, but said axes X and Z should nevertheless be coplanar. The coupling slider 300 is thus movable along the above-mentioned direction X between a position where it is directly coupled to the central head 202 of the base 200 and a position where it is uncoupled from said central head. The position shown in FIGS. 1 and 2 is the position which corresponds to coupling with the central head 202 of the base 200, the coupling slider 300 then being in a retracted position relative to the axis Z of the steering column. In contrast, the position shown in FIGS. 4 and 5 is the position that corresponds to uncoupling from the central head 202 of the base 200, with the coupling head 300 then being in an advanced position relative to the axis Z of the steering column.

Various other equivalent means could naturally be provided for providing direct rotary coupling between the coupling slider 300 and the central locking head 202 of the base 200 when said slider is in its coupled position, which means are of the complementary shape type. In the present case, the rotary coupling between the slider 300 and the central head 202 of the base 200 is obtained by co-operation between associated facets 303 and 208 which in this case are symmetrically inclined towards the front portion of said slider, said front portion being in the form of an extension 301. The special structure of the coupling slider 300 which moves in the guide passage 120 delimited in the present case by two lateral projections 106 of the body of the box 101 is described in detail below with reference to FIGS. 11 to 14.

FIGS. 2 and 5 also serve to show resilient means urging the coupling slider 300 towards its coupled position, said means being constituted in the present case by two helical traction springs 308, each having one end secured to the box 100 and another end secured to the coupling slider 300.

The body of the box 101, more clearly visible in FIGS. 29 to 31, includes a central housing 102 closed at the bottom by a bottom 104 (and at the top by the above-mentioned central cover 600), said bottom being bordered by two lateral projections 106 whose facets 110 that are parallel to the direction X delimiting the guide passage 120 associated with the coupling slider 300. The central housing 102 communicates via a transverse passage 121 with a secondary housing 103 of the box 100, which secondary housing is generally cylindrical in shape with its axis Y being perpendicular to the axis X, and with the plane defined by the axes X and Y also being perpendicular to the axis Z of the steering column. FIG. 30 shows the presence of a flat 129 on a lateral portion of the cylindrical housing 103, said flat serving to angularly position the cylinders of a lock assembly 400 received in the secondary housing 103.

The coupling slider 300 has an extension 301 which penetrates transversely via the above-mentioned passage 121 into the secondary housing 103 of the box 100 in which the lock assembly 400 is disposed.

The lock assembly 400 comprises a plug 401 mounted in a plug cylinder 402 which is secured against rotation in the secondary housing 103, together with a plug spacer 403. The shank of a key C inserted into said lock assembly passes through the plug and the spacer and its end CT can be seen penetrating into an associated notch formed at the end of a moving shaft 405 secured axially to the plug 401 of the lock, which moving shaft is mounted in a cycle cylinder 404 received in the end of the secondary housing 103 of the box, and prevented from rotating therein.

In accordance with an essential aspect of the invention, the moving shaft 405 of the lock assembly 400 co-operates with the extension 301 of the coupling slider 300 to lock the slider in its uncoupled position or to release said slider to take up its coupled position, said operation being possible only when the key C is inserted in accordance with a cycle determined by the cycle cylinder 404 of said lock assembly 400.

In the present case, the extension 301 of the coupling slider 300 and the moving shaft 405 of the lock assembly 400 are shaped not only to lock the coupling slider in its uncoupled position or to release said slider to take up its coupled position, but also to provide other security locking functions which are described below.

A pushbutton suitable for being actuated from outside the box 100, in this case a pushbutton referenced 500, is also provided and serves to return the coupling slider 300 into its uncoupled position against the associated springs 308. Thus, going from the uncoupled position to the coupled position takes place automatically on releasing the positive locking provided by the moving shaft of the lock assembly, whereas going in the opposite direction requires action to be taken on the above-mentioned pushbutton, and it is explained below that this action is possible only when action is taken simultaneously on a key inserted in the lock assembly.

As can be seen more clearly in FIGS. 11 to 14, the coupling slider 300 is made in the form of a plate having a central opening 302 through which the central head 202 of the base 200 passes, said opening having two symmetrically inclined facets 303 for providing coupling with said central head, which facets run together in an enlarged outline 304 which is essentially circular in shape in this case. The shape of the enlarged outline could naturally be different, providing it remains compatible with the shape of the central head. The coupling slider 300 also has a latching end 305, with a notch 319 and a through hole 306 for latching onto one end of a push rod 501 forming a part of the above-mentioned actuating push button 500. The coupling slider 300 includes parallel lateral facets 313 which slide in the associated guide passage 120 of the box 100. As can be seen in the cutaway portions of FIG. 13, the slider 300 also includes lateral housings 309 for receiving guide balls 314 (visible in FIGS. 2 and 5), that guarantee the slider 100 is accurately positioned relative to the lateral projections 106 during axial displacement of said slider between its two positions. To this end, the parallel facets 110 of the box delimiting the guide passage 120 are provided with respective straight grooves 115 providing the looked-for guidance by co-operating with the above-mentioned balls 314.

As its rear end, the coupling slider 300 has fastening recesses 307 associated with the end turns of the traction springs 308. At its front end there is a hole 310 which is associated with at least one positioning ball 311 (the ball is visible in FIGS. 1 and 4), and on its bottom face it has an indentation 312 associated with another locking and positioning ball 111 (also visible in FIGS. 1 and 4). The purposes of the two above-mentioned balls are described below.

The extension 301 of the coupling slider is terminated by a hollowed-out nose 315 having a hollow 316 on its bottom face that is essentially cylindrical in shape and matches a cylindrical portion 408 of the moving shaft 405 of the lock assembly 400. As can be seen in FIG. 2, the moving shaft 405 is constituted by a portion 408 that is essentially cylindrical apart from an intermediate flat 410, and having an enlarged rear portion 406 secured thereto and prevented from moving in translation by a spring clip 407 engaging the plug cylinder 402 (thereby naturally allowing relative rotation to take place). The cylindrical portion 408 of the moving shaft 405 can thus slide and/or rotate in the cycle cylinder 404 with motion that is nevertheless imposed by the cycle of said cycle cylinder: the section of FIG. 7 thus shows a through pin force-fitted in the cylindrical portion 408 of the moving shaft 405, with the ends of the pin projecting into associated openings 412.1 and 412.2 of the cycle cylinder 404. A flat 413 can be observed on said cycle cylinder 404 which co-operates with the flat 129 in the secondary housing 103 of the box. The moving shaft 405 is also subjected to the action of a thrust spring 409 pressing against the end of the cycle cylinder 404. Finally, the cycle cylinder 404 has a lateral recess 417 allowing the extension 301 of the coupling slider to pass so that the hollowed-out nose 315 of said extension can co-operate with the moving shaft 405, either via the cylindrical portion thereof, or else via its intermediate flat. Thus, the moving shaft 405 locks the slider 300 in the uncoupled position by means of its cylindrical portion 408, and it releases said slider when its intermediate flat 410 comes parallel to the sliding direction X of said slider, as can be seen from FIGS. 3a, 3b, and 3c which show the various positions of the moving shaft 405 of the lock assembly 400.

In the present case, a cycle is provided which starting from insertion of the key C into the lock assembly begins with the moving shaft 405 being thrust axially over a short stroke (e.g. 5 mm), the coupling slider 300 is then in its uncoupling position, as shown in FIG. 3a. Thereafter, the cycle includes rotation (in this case clockwise) of the primary shaft 405, over a first angular range, e.g. 30°, corresponding to the code on the key being recognized, as shown in FIG. 3b (The lock plug automatically stops rotation of the key if it does not match). Rotation can then continue over a second angular range, e.g. through 90°, providing the code of the key is recognized. Finally, a position is reached which corresponds to FIG. 3c, in which position the coupling slider 300 can retract under the action of the associated traction springs 308.

Once the position shown in FIG. 3c has been reached, it is then advantageous to provide for the moving shaft 405 to retract axially, e.g. over a stroke of 5 mm (by an appropriate arrangement of the opening in the cycle cylinder). Such retraction makes it easy to obtain angular locking of the moving shaft 405 in the coupled position by means of the ends of the through pin 411 being received in respective axial portions of the openings provided for this purpose in the cycle cylinder 404. To this end, the hollowed-out nose 315 of the extension 301 of the coupling slider 300 has a lateral notch 318 on its side furthest from the end of the lock assembly in which the key is inserted, leaving a residual portion 317, this notch receives a radial rim (or shoulder) 416 of the moving shaft 405 adjacent to the intermediate flat 410 of said shaft when the coupling slider 300 is in its coupled position, as shown in FIG. 2.

This option provides very important practical advantages. Firstly, the bottom surface of the lateral notch 318 is in abutment against the portion of the cylindrical lateral surface which is adjacent to the radial rim (or shoulder) 416, thereby making it impossible to exert thrust on the coupling slider 300 tending to cause it to move away from its coupled position: a positive axial abutment is thus obtained which prevents the system becoming uncoupled by untimely action on the actuating pushbutton 500. In addition, untimely action on the key C, e.g. by pushing in said key while turning it can do no more than bring the intermediate flat 410 through rotation of slightly less than 120° so that it bears against the top portion of the nose 315, such that such untimely operation can under no circumstances on its own achieve displacement of the coupling slider 300 to return it to its uncoupled position.

Thus, it is necessary to act manually on the pushbutton 500 while simultaneously acting on the moving shaft 405 by applying thrust to the inserted key C (and turning it) before the coupling slider 300 can be moved from its coupled position to its uncoupled position. This operation requires the driver to use both hands simultaneously and provides very considerable security in preventing any risk of untimely uncoupling of the system. It is therefore advantageous to provide the hollowed-out nose 315 with a lateral notch on the coupling slider 300 together with a cycle cylinder 404 that is designed in such a manner that the moving shaft has axial play when in two special angular positions described above. In the uncoupled position, the hollowed-out nose 315 is in contact via its hollow 316 with the cylindrical portion 408 of the moving shaft 405.

The security device 10 also includes a protection system for preventing an intruder releasing the coupling slider 300 by inserting a bad key or a tool into the plug of the lock.

A security locking washer 415 can be seen in FIGS. 2 and 5 and more clearly in the section of FIG. 6, which washer is mounted on the spacer 403 of the lock plug 401, thus being constrained to rotate with said spacer, said washer having at least one lug passing through an associated slot in the moving shaft 405 of the lock assembly. In the present case, the washer 415 has two oppositely-directed lugs 415.1 each received in an associated slot 406.2 (the rear portion 406 of the moving shaft 405 is then made as two separate portions 406.1 so as to define the above-mentioned slots 406.2). The outside diameter of the security locking washer 415 in the region of its lugs 415.1 is naturally less than the inside diameter of the plug cylinder 402. Thus, in the event of an attempt to force the lock by inserting a tool into the plug for the purpose of rotating the moving shaft 405, the moving shaft can be rotated through no more than a few degrees until it comes into abutment against one or other of the lugs 415.1 of the security locking washer 415 which is itself prevented from rotating by the spacer 403 which is stationary. This security locking device could be designed differently, as described below with reference to FIGS. 36 and 37.

FIGS. 15 and 16 show the structure of the base 200 more clearly, with its base plate 201 and its central locking head 202. The base plate 201 includes a plurality of holes 205 associated with passing the heads of bolts for fixing the base 200 on the inwardly-directed rim of the extension associated with the steering column. The base plate 201 also includes a circular path 206 for receiving balls 141 (visible in FIGS. 1 and 4) via which said base plate 201 engages the bottom 104 of the box 100. The balls 141 can thus move along the circular path 206 formed in the top face of said base plate when the coupling slide is in its uncoupled position, when the steering wheel can rotate freely. The locking central head 202 has firstly two inclined facets 208 which co-operate with the corresponding facets 303 of the slider 300 when in its coupling position, and has secondly a cylindrical surface 209 into the direct vicinity of which enlarged outline 304 of said slider comes when in its uncoupled position. FIGS. 2 and 5 make it possible clearly to distinguish the relative positions of the coupling slider 300 and the central head 202 of the base 200 in these two special positions. The base plate 201 also has an indentation 207 associated with a ball 111 (visible in FIGS. 1 and 4) serving for locking and positioning as described below. The locking central head 202 has a blind hole 210 for receiving an audible warning ball 211 (also visible in FIGS. 1 and 4) with a trust spring, said ball co-operating with a serrated surface of the central closure cover 600 mounted on the top, as described below.

The box 100 is secured to the base 200 by a securing ring 125 bearing against the bottom edge 204 of the periphery 203 of the base 200 via a spring washer 127. The securing ring 125 and the associated spring washer 127 are visible in FIGS. 1 and 4, and it can be seen that the securing ring 125 is itself connected to the box 100 by snap-fastening with an associated spring clip 126 (in a variant, the securing ring 125 could have been screwed to the box 100). Still with reference to FIGS. 1 and 4, it can also be seen that there is an axial skirt 128 protecting the top portion of the steering column, which skirt is preferably constituted by rings or shells (e.g. threaded) which are connected to one another and to the above-mentioned securing ring 125. The figures show a single ring 128.1, but it should be understood that the full skirt (shown in dot-dashed lines) could be built up from an arbitrary number of such rings. In this way, the length of the protective skirt can always be adapted to the type of steering column in question.

As mentioned above, a certain number of locking and/or positioning balls are provided and the function and methods of action thereof are now described in greater detail.

A ball 311 is initially disposed with its associated spring (not shown) in the hole 310 of the coupling slider 300, said ball being urged by its spring against the bottom 104 of the box housing 101, which bottom is provided with two small indentations 113 and 114 corresponding respectively to the retracted coupled position and to the extended uncoupled position, said indentations being more clearly visible in FIGS. 29 and 30. The ball 311 thus positions the coupling slider in its two special positions. This positioning also provides an additional effect of maintaining the slider in the coupled position, by contributing to absorbing vibration. In a variant, it would naturally be possible to provide two positioning balls disposed laterally on either side of the longitudinal midplane of the coupling slider, in which case the bottom of the box should be provided with two associated pairs of indentations.

As is more clearly visible in FIGS. 29 and 30, the bottom 104 of the housing body 101 also has a hole 112 which is associated with a locking and positioning ball. This ball, referenced 111, is clearly visible in FIGS. 1 and 4. This locking and positioning ball 111 is associated firstly with an indentation 207 formed in the base plate 201 of the base 200, and secondly with an indentation 312 formed in the bottom of the coupling slider 300. The locking and positioning ball 111 is thus received from below in the indentation 207 when the steering wheel is properly positioned, i.e. when the X direction of the slider is in alignment with the above-mentioned indentation 207. When the coupling slider 300 is in its coupled position, as shown in FIG. 1, the locking and positioning ball 111 is locked in position by the bottom face of said slider, so that it cannot escape from its indentation 207. In contrast, when in the uncoupled position, as shown in FIG. 4., the indentation 312 of the coupling slider 300 is then level with the ball 111 such that rotation of the steering wheels automatically causes said ball to rise a little, thereby leaving the associated indentation 207, with the ball then rotating together with the monolithic assembly constituted by the slider and the box, said ball thus locking the slider in its uncoupled position. The ball 111 naturally maintains this locking of the coupling slider 300 so long as the steering wheel is not properly positioned, i.e. until it is brought back to its reference position with the direction X again being in line with the indentation 207. Thus, if the steering wheel is rotated while it is not constrained to rotate the steering column because the coupling slider is uncoupled, then the ball 111 provides lateral positioning insofar as the coupling slider 300 can only slide back again towards its coupled position when the ball 111 is in its correct position.

The recoupling procedure thus takes place automatically without the driver having to find the proper position by visual or audible marking. It suffices to operate the moving shaft 405 of the lock assembly (by inserting the key) in such a manner that its intermediate flat 410 is disposed in a horizontal plane (parallel to the sliding direction X of the slider), as shown in FIG. 3c, after which it suffices to rotate the steering wheel until the ball 111 drops back into its indentation 207 when the steering wheel is in the proper position, thereby automatically releasing the coupling slider which then retracts instantaneously under the action of its associated traction springs 308.

The last ball 211, received in the blind hole 210 of the locking head 202 of the base 200, comes into contact with a serrated surface 606 formed on the outside of the central cover 600 whereby the box 100 is caused to rotate with the vehicle steering wheel. This ball 211 thus acts as an audible warning device telling the driver that the steering wheel is not coupled to the steering column.

The structure of the pushbutton 500 actuatable from outside the box 100 is now described in greater detail. This pushbutton is provided to return the coupling slider 300 to its uncoupled position against the springs 308. The term "pushbutton" should be understood in a wide sense, covering any through mechanism enabling the relevant action to be taken. As can clearly be seen in FIGS. 2 and 5, and also in FIGS. 32 and 33, the pushbutton 500 comprises firstly a push rod 501 and secondly an operating arm 504 hinged to the box 100, which arm has a portion 509 bearing against said push rod. The push rod 501 is generally cylindrical in shape and it slides in a passage 117 passing through the body of the box 101 (more clearly visible in FIGS. 29 and 30) such that its hook-shaped end 502 can couple with the rear end of the coupling slider 300. The other end 503 of the push rod 501 which is always outside the box whatever the position of the coupling slider 300 is contacted by the portion 509 of the hinged operating arm 504. This operating arm 504 has two tabs 505 associated with the hinge pin 506, beyond which there extends a main portion of the arm 507 which is curved to follow the outline of the body of the box, and whose free end has an inwardly directed lug 508. A torsion spring 510 can be seen which urges the operating arm 504 to pivot in the direction which causes the push rod to enter into the box. FIG. 29 shows a first recess 122 associated with the tabs 505 of the operating arm 504 and a hole 123 associated with the pin of the hinge 506 of said arm. A further recess 124 is provided to receive the inwardly directed lug 508 of the arm. The operating arm 504 thus constitutes a visual alarm, and the visual factor can be further reinforced by providing a fluorescent pellet on the inwardly-directed lug at the end of the arm, for example. In a variant, the end of the arm may be shaped to provide an operating handle (as shown in FIG. 35) so as to make it easier to actuate said arm by said end in order to push in the push rod. In addition, the box and/or the operating arm may advantageously be shaped in such a manner that the portion 509 of said arm is integrated in the box without projecting outside it, regardless of the position of the operating arm (as shown in FIGS. 34 and 35).

To finish off the description of the box equipment, there can also be seen with reference to FIGS. 29 and 30, two fastening projections 108 associated with the ends of the traction springs 308, and axial recesses 109 facilitating integration of the springs in order to obtain optimum compactness. The bottom 104 of the box has a central hole 105 through which the central locking head 202 of the base 200 penetrates. This bottom 104 also has two circular openings 107 level with its lateral projections 106 providing access to the fixing bolts that pass through the holes 205 in the base 200 and 16 for fixing the hub of the steering column, thereby enabling the device to be installed initially by progressively rotating the box to gain access to each of the fixing bolts in turn. FIG. 30 also shows an indentation 18 in the underside of the bottom 104 of the body of the box, which indentation is associated with one of the balls 141 which travel in the circular path 206 of the base 200. Finally, the bottom portion of the body of the box 101 has a groove 119 associated with a spring clip 126 that provides a connection between the securing ring 125 and the body of the box, and the top portion thereof has an analogous groove 116 associated with a spring clip 603 that connects said box to its closure cover 600.

The box 100 is constrained to rotate with the steering wheel by means of the central cover 600 which is snap-fastened by the spring clip 603 on said box, which central cover is locked in rotation by associated means accessible from outside the box. In the present case, the central cover 600 is made in two parts 601 and 602 which interfit, and which are secured together in a manner which is not dismountable, this being done in the present case by snap-fastening by means of an associated spring clip 604. The central cover 600 thus includes a bottom portion which is locked to the box 100 and a top portion 602 in the form of a ring engaging in said bottom portion, said top portion 602 being tapped at 611 for fixing the steering wheel, as is more clearly visible in FIGS. 32 and 33. These figures also show holes 610 on the top portion of the ring-shaped cover 602, which holes are associated with pins which constrain the two portions of the central cover 600 to rotate together. The advantage of making the central cover in two parts in this way lies in the possibility of easily adapting the ring-shaped top portion to each type of steering wheel fixing: during initial assembly, it then suffices to mount said top portion constituting the adaptor on a bottom portion which is already installed. The undismountable nature of the connection between the two portions of the cover guarantees that access cannot be obtained to the internal components of the device.

The bottom portion 601 of the cover has a rim 609 surrounding a bottom 605, which bottom portion is then completely integrated in the body of the box. As can be seen more clearly in FIGS. 8 and 9, the bottom portion 601 of the central cover 600 includes 36 indentations 612 in its periphery, e.g. disposed at 10° intervals for adjusting the angular position of the steering wheel relative to the box 100. The central cover 600 is then prevented from rotating by means 130, one of which is visible in FIG. 9. The body 101 of the box thus includes a plurality of through tapped holes 131 (e.g. four) which receive lock screws 132 whose pointed ends penetrate into an associated indentation 612 of the central cover 600, with locking being ensured by an additional screw 133. Obstruction may be provided by a washer constituting a cover. When it is desired to change the angular position of the steering wheel, it suffices to undo the screws 132 and 133, and then to turn the steering wheel together with the central cover relative to the box until the desired angular position is reached, with the steering wheel then being locked in the new position by means of above-mentioned screws 132 and 133. It may also be advantageous to use positioning means including a ball 135 (shown in FIG. 8), which means are constituted by a support screw 136 inserted in a tapped hole 137 of the box, said support screw having a positioning ball 138 which penetrates into one or other of the indentations 612 of the central cover 600 like a ratchet. As before, the associated tapped hole 137 is masked from the outside by a cover-forming washer.

The section of FIG. 10 shows that the top portion 602 of the central cover 600 masks an opening 613 in the bottom portion 601, which opening faces the above-mentioned opening 107 in the body 101 of the box.

As can be seen in FIGS. 1 and 4, the audible warning ball 211 co-operates with a serrated surface 606 which in this case is formed on the outside of the bottom portion 601 forming the central cover 600.

Figure 33:
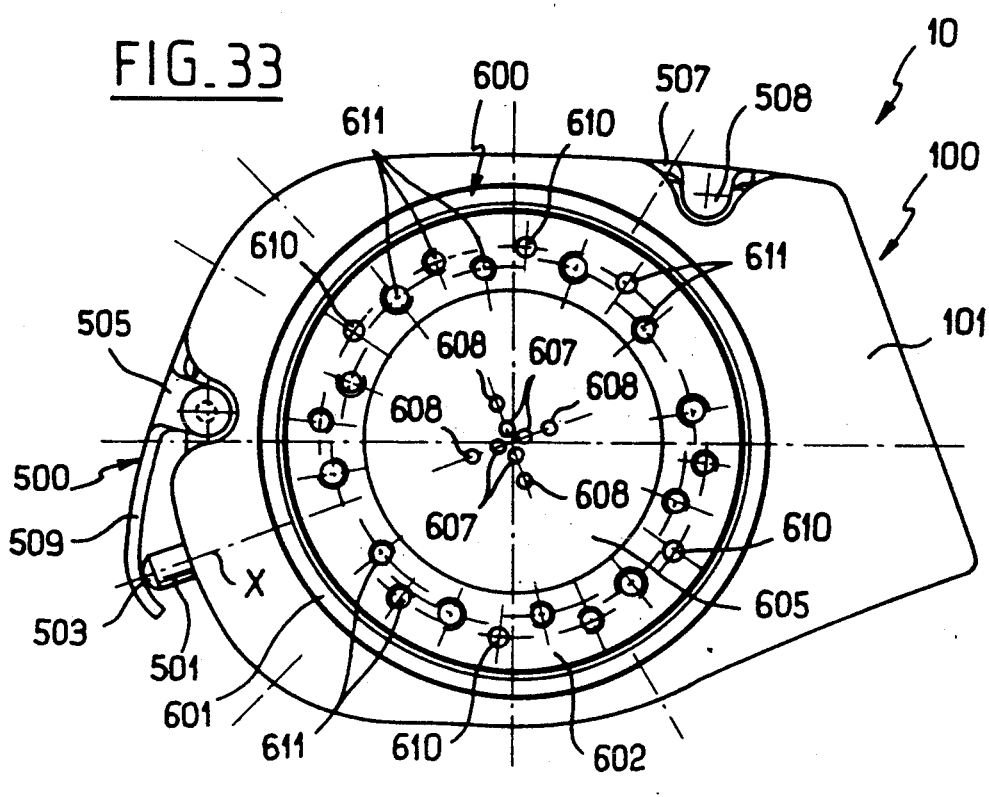

Furthermore, as can be seen more clearly in FIGS. 32 and 33, the bottom portion 601 of the central cover 600 includes first holes 607 in the central region of its bottom 605, which holes are associated with passages for passing any connection wires leading to the steering wheel, and it is also provided with second holes 608 for providing rotary coupling with an assembly constituting a rotary contact 700 which is received in a central bore 212 of the base 200, as can be seen in FIGS. 1 and 4. Naturally, the holes 608 could be replaced by machining that does not pass through. This assembly forming a rotary contact 700 thus makes it possible to provide electrical connections by passing the connection wires leading to the steering wheel without any risk of these wires being broken by excessive rotation of the steering wheel when uncoupled from the steering column.

An assembly constituting a rotary contact 700 that is particularly suited for this function is shown in greater detail in FIGS. 17 to 28.

FIGS. 17 and 18 show the rotary contact assembly overall, with connection wires 725 leading to the steering wheel, and connection wires 726 going towards the steering column. The rotary contact assembly 700 is thus integrated in the base 200 of the security device. The components of this assembly 700 are shown individually in FIGS. 19 to 28.

FIGS. 21 and 22 thus show a tubular body 702 having a raised end wall 708 provided with a circular central orifice 709. The body 702 also has a plurality of axial grooves 710 (four in this case) which are disposed in a square configuration and which run along the entire height of the tubular body. A recess 721 is formed beneath the end wall 708 to receive a fixing washer described below.

FIGS. 19 and 20 show a top cap 701 comprising a circular portion 703 forming the cap per se from which there extends a star-section central core 704. The portion 703 has holes 706 for passing the connection wires 725, and projections 707 for providing rotary coupling with the cover 600 of the security device (these projections penetrate into the holes 608 in the bottom 605 of said cover). The central core 704 is cruciform in this case, given that there are four wires. The four axial grooves 710 of the body 702 are likewise disposed in a square configuration.

Use is also made of a first type of electrical contact in the form of a contact washer 711 as shown in FIGS. 23 and 24, with the central opening 714 thereof allowing the core 704 of the top cap 701 to pass therethrough. Each contact washer 711 has an outwardly extending and generally circularly-shaped lug 715. A second type of contact is shown in FIGS. 27 and 28, in which there can be seen a contact washer 712, having a central opening 716 through which the central core 704 of the top cap 701 passes, this type of contact washer has an inwardly directed projecting lug 717 which is likewise generally circular in shape.

FIGS. 25 and 26 show an insulating washer 713 whose central opening 718 serves to pass the above-mentioned cruciform core 704.

It then suffices to stack together successive assemblies each constituted by a contact washer 712, a contact washer 711, and an insulating washer 713. During said stacking, the outwardly directed lugs 715 of the contact washers 711 are engaged in the axial grooves 710 of the tubular body 702, while the inwardly-directed lugs 717 of contact washers 712 are received in the grooves 724 defined by the cruciform section of the core 704 of the top cap 701, as can be seen in the section of FIG. 18.

The resulting stack is shown in FIG. 17, in which there can also be seen at the two ends of said stack, two washers 719 and 720 which are corrugated washers made of spring steel, guaranteeing sufficient compression to ensure electrical contact of very good quality. The stack made in this way is then held together between the portion 703 of the top cap 701 and the end wall 708 of the tubular body 702. The assembly is locked together by a spring washer 722 which is threaded onto a cylindrical end 705 of the cruciform core 704 that passes through the orifice 709 in the end wall of the tubular body.

Before making such as assembly, which can be performed automatically, connections are soldered between the wires 725 and the top contact washers 712, and between the wires 726 and the bottom contact washers 711, these connections being performed on the associated projecting lugs, respectively referenced 717 and 715.

The cruciform shape of the core 704 with its four branches 723 is particularly clearly visible in FIG. 18. Nevertheless, it is clear that a different angular distribution could be provided if electrical connections are to be made with a different number of wires. Similarly, the components 701 and 702 could be lengthened, thereby enabling a larger number of contacts to be stacked.

In the above figures, the axis Z of said rotary contact assembly 700 is shown to recall that said assembly is disposed coaxially on the base 200 of the security device.

Various items of auxiliary equipment for the security device of the invention are described below.

In FIG. 31, there can be seen, in addition to two of the tapped holes 131 associated with preventing rotation of the central cover, a housing 140 which opens out sideways from the body of the box. If reference is now made to FIGS. 2 and 5, the same housing 140 can be seen having a capsule 142 disposed therein constituting an electronic marker that is readable by means of a scanner. Under such circumstances, the capsule 142 may be a capsule of glass coated with a plastic cylinder, the assembly being inserted in the associated housing 140 so as to be inaccessible from the outside. It is possible, in particular, to use a chip, thereby providing genuine encoding for the box of the security device, thus making it possible to ensure that said device is indeed fitted to an original vehicle and not to a stolen vehicle. The possibility of reading this capsule by means of a scanner may also be used for computerized processing of such data, which can be held in a central file.

FIGS. 2 and 5 also show a disk 145 closing the secondary housing 103 associated with the lock assembly 400, said disk being secured by a spring clip 143 so as to be free to rotate in the entrance to said housing. As can be seen more clearly in FIG. 31, the disk 145 includes a slot 144 through which the key C is inserted.

An anti-theft security device is thus provided which is extremely effective with respect to security, reliability, and ease of use. The vertical extent of the device is minimal (the top of the box may be about 26 mm above the hub of the steering column). The steering torque that can be obtained in the coupled position exceeds 45 kilogram meters because of the large contact areas engaged in the coupling. The locking provided by the various balls is also provided in a manner that is particularly simple and reliable. The large number of positioning surfaces also makes it possible to set the initial position of the steering wheel appropriately, regardless of the type of steering wheel concerned. Resistance to being torn off is particularly high because of the mounting on a base (it is possible to achieve an assembly that withstands a pulling-apart force of at least 5 tons).

The degree of security provided is high since the only lateral access to the device is constituted by the disk 145 which is free to rotate. Finally, various security features are described above that are obtained by the special shapes of the moving shaft of the lock assembly, and of the extension of the coupling slider.

A variant device of the invention is described below with reference to FIGS. 34 to 37.

This variant includes a large number of members that are identical or analogous to those of the device described above, and the same references are used for said members.

It should firstly be observed that the body 101 of the box has a lateral recess 134 enabling the portion 509 of the operating arm 504 to be received regardless of the position of said arm. In addition, the end of the arm has an operating handle 508.1 to facilitate actuating said arm, in particular when causing the push rod 501 to penetrate into the body of the box.

In addition, the moving shaft 405 of the lock assembly has an intermediate flat constituted by two half-flats 410.1 and 410.2 which are at a small angular offset (in this case at an angle of about 160°), and the front portion 408 of said moving shaft has a sloping facet 430 which co-operates with the sloping end face of the extension 301 of the coupling slider 300 in the coupled position of said slider. In addition, the indentation 312.1 associated with the positioning and locking ball 111 is elongate in the sliding direction X of the slider 300.

In this way, starting from the uncoupled position, as soon as half-flat 410.2 becomes parallel to the direction X, the slider 300 is retracted a little (because of the elongate indentation), thereby making it possible to ensure that the moving shaft cannot return to beneath the hollow 306 in said slider on reaching the end of the key insertion cycle. The half-flat 410.1 serves to allow normal displacement of the slider towards its uncoupled position. In the coupled position, co-operation between the inclined face and the inclined facet (relative to the Y axis) makes it impossible in this position to perform any untimely operation on the slider 300 and the moving shaft 405, as was previously achieved by the lateral notch 318 in the extension 301 of said slider.

Finally, FIGS. 36 and 37 show more clearly the variant in the security locking means associated with the lock assembly 400, and replacing the above-described washer 415.

The moving shaft 405 now has a central hollow associated with an intermediate security locking piece 450. This piece includes a tab 451 passing between the spacer 403 of the lock plug 401 and the moving shaft 405, and an axial head 452 provided with a flat 454. The hollow in the moving shaft includes, in succession a cylindrical housing 431 and a housing 432 having a flat that corresponds to the flat on the axial head 452. A spring 455 is received in an end wall 433 of the recess in the moving shaft and in an end wall 453 of the axial head 452.

The piece 450 is axially movable along the direction Y, between an unlocked rear position (FIG. 37) and a locked front position, and in both of these positions, the tab 451 remains coupled to the spacer 403.

It is then necessary to use an extended key C.1 which is longer than a conventional key.

In this way, if the key has both the correct code and the correct length, insertion of said key displaces the piece 450 to its front position where said piece then provides normal i.e. correct, coupling between the spacer of the plug and the moving shaft.

In contrast, if an attempt is made to force the lock with a key that is too short, the piece 450 remains in its rear position and the spacer of the plug rotates freely with said piece but without driving the moving shaft 405. If an attempt is made to force the lock with an elongate lock pick (or skeleton key), then the part 450 is indeed pushed to its front position but rotation continues to be prevented by the tab 451 of said piece while is still engaged with the spacer of the plug.

The invention is not limited to the embodiments described above, but on the contrary covers any variant that uses equivalent means to reproduce the essential characteristics specified above.

In particular, the lock and its plug could be replaced by any equivalent system having pneumatic, hydraulic, electromechanical, electromagnetic, electrical, or electronic control.

In addition, the security device could be used not only as an anti-theft device for vehicles (having 2, 3, 4 or more wheels), but also for valves or other members that require security against unauthorized use (in which case the term "steering column" should be understood as designating a functional control shaft).

I claim:

1. A security device, in particular an anti-theft device for the steering wheel of a motor vehicle, the device being of the type suitable for constraining the steering column to rotate with the steering wheel, or for allowing the steering wheel to rotate relative to said column, wherein the device comprises:
    a base secured to the steering column, said base comprising a base plate extending perpendicularly to the axis of said steering column, and a central locking head;
    a box secured to rotate with the steering wheel and mounted on the base so as to be capable of rotating about the axis of the steering column, said box including a guide passage in which a coupling slider in the form of a plate is received, said coupling slider having a central opening through which the central locking head of said base passes, and being furthermore received to slide along a sliding direction substantially perpendicular to the axis of the steering column between a coupled position where said coupling slider is directly coupled with the central head of said base and an uncoupled position where said coupling slider is uncoupled from said central head, said coupling slider having an extension which penetrates transversely into a secondary housing of the box and also being subjected to the action of resilient means urging it towards its coupled position;
    a lock assembly disposed in the secondary housing, said lock assembly including a cycle cylinder mounted stationary in the box to determine a cycle of insertion for a key, and a moving shaft associated with said cycle cylinder and axially linked to a lock plug, said moving shaft being movable about an axis substantially transverse to the sliding direction of the coupling slider, and co-operating with the extension of the coupling slider to lock said coupling slider in its uncoupled position or to release said slider to take up its coupled position, said co-operation being possible only with a correct insertion of the key in compliance with the cycle determined by said cylinder; and
    a pushbutton activatable from outside the box enabling the coupling slider to be returned to its uncoupled position against the associated resilient means.

2. A device according to claim 1, wherein the direct coupling between the slider and the central head of the base when said slider is in its coupled position is obtained by co-operation between associated facets which are symmetrically inclined towards the extension of said slider, said facets including facets provided internally on the central opening of said slider, and corresponding facets provided externally on the central locking head of said base.

3. A device according to claim 2, wherein the central opening of the coupling slider includes two symmetrically inclined facets which run into each other via an essentially circular enlarged outline, and wherein the central head of the base has firstly two corresponding inclined facets which co-operate with said symmetrically inclined facets of the slider when in the coupled position of said slider, and secondly a cylindrical surface in the direct vicinity of which the enlarged outline of said slider comes when in the uncoupled position of said slider.

4. A device according to claim 1, wherein the moving shaft of the lock assembly is essentially cylindrical apart from an intermediate flat, and the extension of the coupling slider terminates in a hollowed-out nose in such a manner that said moving shaft locks the slider in the uncoupled position of said slider by means of its cylindrical portion and releases said slider when its intermediate flat is substantially parallel with the sliding direction of said slider.

5. A device according to claim 4, wherein the hollowed-out nose of the extension of the coupling slider has a lateral notch on its side laterally furthest from the end of the lock assembly into which the key is inserted, and in which a shoulder of the moving shaft adjacent to the intermediate flat of said shaft is received when said slider is in its coupled position, so that in said coupled position, untimely operation of said slider and untimely operation of said shaft are simultaneously prevented.

6. A device according to claim 4, wherein the intermediate flat is constituted by two half-flats at a small mutual angular offset, and the bottom of the coupling slider has an indentation associated with a locking and positioning ball, which indentation is elongate in the sliding direction of said slider.

7. A device according to claim 6, wherein the extension of the coupling slider has an end face which is inclined relative to the axis of the moving shaft of the lock assembly, and the moving shaft has a corresponding inclined facet, said inclined end face of said inclined facet being in contact with each other in the coupled position of said slider, such that when in said coupled position, untimely operation of said slider and untimely operation of said shaft are simultaneously prevented.

8. A device according to claim 1, wherein the cycle cylinder of the lock assembly is designed in such a manner that the moving shaft has axial clearance in two special angular positions, said moving shaft also being subjected to the action of a thrust spring tending to maintain the angular locking achieved in this way, such that in order to move the coupling slider from its coupled position to its uncoupled position it is necessary to act simultaneously both on the pushbutton by manual action and on the moving shaft by applying thrust on an inserted key.

9. A device according to claim 8, wherein the lock plug of the lock assembly includes a lock spacer, said spacer carrying a security locking washer which is constrained to rotate together therewith, said washer having at least one lug passing through an associated slot of the moving shaft of said lock assembly.

10. A device according to claim 8, wherein the lock assembly further includes an intermediate security locking piece received in the moving shaft, said locking piece being coupled in rotation to the lock plug of said lock assembly and being movable along the axis of the moving shaft of said assembly, so as to provide coupling between a lock spacer of said lock plug and said shaft only when said locking piece is pushed back against an associated return spring by the end of an elongate key.

11. A device according to claim 1, wherein the externally actuatable pushbutton comprises firstly a push rod having one end latched to the coupling slider, and having its other end projecting from the box, and secondly an operating arm hinged on said box, with a portion thereof bearing against said push rod.

12. A device according to claim 1, wherein the passage is defined by two lateral projections, and wherein firstly at least one positioning ball is also provided to mark the coupled and the uncoupled positions of said coupling slider, and secondly guide balls are provided to obtain accurate positioning of said coupling slider relative to the said lateral projections during displacement of said slider between said coupled and uncoupled positions.

13. A device according to claim 11, wherein the bottom of the box also has a hole for a locking and positioning ball, the bottom of which is received in an indentation in the base plate of the base when the steering wheel is properly positioned, the coupling slider also having an indentation in which the top of said locking and positioning ball is received in the uncoupled position of said slider in the event of the steering wheel being rotated, thereby locking said slider in said uncoupled position, said ball continuing to lock it in said uncoupled position so long as the steering wheel is not correctly positioned.

14. A device according to claim 11, wherein the bottom of the box rests on the base plate of the base via balls which run on a circular path provided in the top face of said base plate, the box being secured to the base by a securing ring bearing against the bottom edge of said base via a spring washer.

15. A device according to claim 14, wherein the steering column has a top portion which is protected by a coaxial skirt carried by the box, said skirt being built up from rings or shells connected to one another and to the securing ring in such a manner as to enable the height of said skirt to be adapted to the type of steering column in question.

16. A device according to claim 1, wherein the box is constrained to rotate with the steering wheel by means of a central cover which is snap-fastened by a spring clip on said box, said central cover being locked in rotation with respect to said box by associated locking means which are accessible from outside the box.

17. A device according to claim 16, wherein the central cover is made in two parts which interfit and which are secured to each other in undismountable manner, with a bottom part being locked to the box and a top part in the form of a ring engaging is said bottom part, said top part having tapped holes associated with means for fastening to the steering wheel.

18. A device according to claim 17, wherein the bottom part of the central cover has indentations arranged at regular angular intervals on its periphery, for the purpose of adjusting the angular position of the steering wheel relative to the box, a ball positioning means being further provided for co-operating with said indentations in order to facilitate such angular positioning.

19. A device according to claim 17, wherein the central head of the base carries an audible warning ball co-operating with a serrated surface formed externally on the bottom part of the central cover, thereby providing a warning when the steering wheel is not coupled to the steering column.

20. A device according to claim 17, wherein a central region of the bottom part of the central cover includes both first holes for passing any connection wires leading to the steering wheel, and second holes for rotary coupling to an assembly received in a central bore of the base and forming a rotary contact.

21. A device according to claim 20, wherein the rotary contact assembly comprises a tubular body having axial grooves secured to the base and a top cap having a star-shaped central core coupled to rotate with the bottom part of the central cover, together with a succession of stacks each constituted by a first contact washer coupled to the body via an axial groove thereof, the second contact washer coupled to the top cap via the central core thereof, and an insulating washer.

22. A device according to claim 21, wherein the rotary contact assembly includes a body having four axial grooves disposed in a square configuration and a top cap having a cruciform central core.

* * * * *